(12) United States Patent
Hari et al.

(10) Patent No.: US 9,930,119 B2
(45) Date of Patent: Mar. 27, 2018

(54) HETEROGENEOUS CELLULAR OBJECT TRACKING AND SURVEILLANCE NETWORK

(71) Applicant: ALCATEL-LUCENT USA INC., Murray Hill, NJ (US)

(72) Inventors: Adiseshu Hari, Holmdel, NJ (US); Lawrence O'Gorman, Murray Hill, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 540 days.

(21) Appl. No.: 14/317,817

(22) Filed: Jun. 27, 2014

(65) Prior Publication Data

US 2015/0381940 A1     Dec. 31, 2015

(51) Int. Cl.
*H04N 7/18* (2006.01)
*H04L 29/08* (2006.01)

(52) U.S. Cl.
CPC .............. *H04L 67/12* (2013.01); *H04L 67/18* (2013.01)

(58) Field of Classification Search
CPC ................................ H04L 67/12; H04L 67/18
See application file for complete search history.

(56) References Cited

U.S. PATENT DOCUMENTS

| | | | | |
|---|---|---|---|---|
| 2005/0004759 A1* | 1/2005 | Siegel | ..................... | G01S 13/66 701/519 |
| 2007/0286456 A1* | 12/2007 | Ariyur | ..................... | G06K 9/32 382/103 |
| 2009/0268030 A1* | 10/2009 | Markham | ................. | G01S 3/54 348/158 |
| 2014/0334676 A1* | 11/2014 | Skans | .................. | G06K 9/6201 382/103 |

* cited by examiner

*Primary Examiner* — Tat Chio
(74) *Attorney, Agent, or Firm* — Carlson, Gaskey & Olds, P.C.

(57) ABSTRACT

An illustrative example surveillance system designed according to an embodiment of this invention includes a plurality of cells that respectively include a surveillance network including at least one detector that is configured to detect at least one type of subject. The cells have respective detection areas within which a subject may be detected by the at least one detector of that cell. A controller of the cell determines information regarding tracking of a detected subject that is in that cell. The controller hands off tracking of the subject to a second one of the cells based upon an indication that the tracked subject is moving toward the detection area of the second one of the cells.

16 Claims, 3 Drawing Sheets

HETEROGENEOUS CELLULAR OBJECT TRACKING AND SURVEILLANCE NETWORK

1. TECHNICAL FIELD

In general terms, the subject matter of this document pertains to subject tracking. More particularly, and without limitation, the subject matter of this document pertains to cellular based subject tracking using two types of detection and handoffs among cells.

BACKGROUND

Sensor based surveillance and object tracking typically depends upon sensors of a single type, such as video cameras or thermal cameras. Such sensors generate real time sensor feeds and intelligence is layered on top of the raw sensor feed to detect objects or movements of objects. Advanced systems have the ability to track objects across sensor feeds so that movement of an object of interest across a sensor boundary does not end tracking of that object. Tracking may be continued using a new sensor feed. Such systems are still monolithic in nature and not designed to interoperate.

For example, there is no federation of separate surveillance systems to form a single, integrated surveillance network. Current surveillance systems also lack features in that they do not take advantage of additional types of information beyond that provided by the single type of sensor upon which the system has been based.

SUMMARY

An illustrative example surveillance system designed according to an embodiment of this invention includes a plurality of cells that respectively include a surveillance network including at least one detector that is configured to detect at least one type of subject. The cells have respective detection areas within which a subject may be detected by the at least one detector of that cell. A controller of the cell determines information regarding tracking of a detected subject that is in that cell. The controller hands off tracking of the subject to a second one of the cells based upon an indication that the tracked subject is moving toward the detection area of the second one of the cells.

Another illustrative surveillance system designed according to an embodiment of this invention includes a first type of detector that detects a first characteristic of a subject. A second type of detector detects at least one feature of at least one wireless signal associated with the subject. A tracking module tracks the subject based upon information from the first type of detector and information from the second type of detector.

An illustrative example surveillance method designed according to an embodiment of this invention utilizes a plurality of cells that respectively include a surveillance network including at least one detector that is configured to detect at least one type of subject. The cells have respective detection areas within which a subject may be detected by the detector of that cell. The method includes obtaining information regarding tracking of a detected subject that is in a first one of the cells. Tracking of the detected subject is handed off from the first one of the cells to a second one of the cells based upon an indication that the tracked subject is moving toward the detection area of the second one of the cells.

Another illustrative example surveillance method designed according to an embodiment of this invention includes detecting a subject using a first type of detector that detects a first characteristic of the subject. The subject is detected using a second type of detector that detects at least one feature of at least one wireless signal associated with the subject. The subject is tracked based upon information regarding the subject from the first type of detector and the second type of detector.

Another illustrative example surveillance system designed according to embodiment of this invention includes at least one detector configured to detect the subject within a detection area. At least one lighting device provides light within the detection area. A controller determines a location of the detected subject within the detection area. The controller controls the lighting device to illuminate the determined location of the tracked subject with illumination that differs from illumination in at least one other location within the detection area.

The various features and advantages of disclosed example embodiments will become apparent to those skilled in the art from the following detailed description. The drawings that accompany the detailed description can be briefly described as follows.

DETAILED DESCRIPTION

Figure 1:
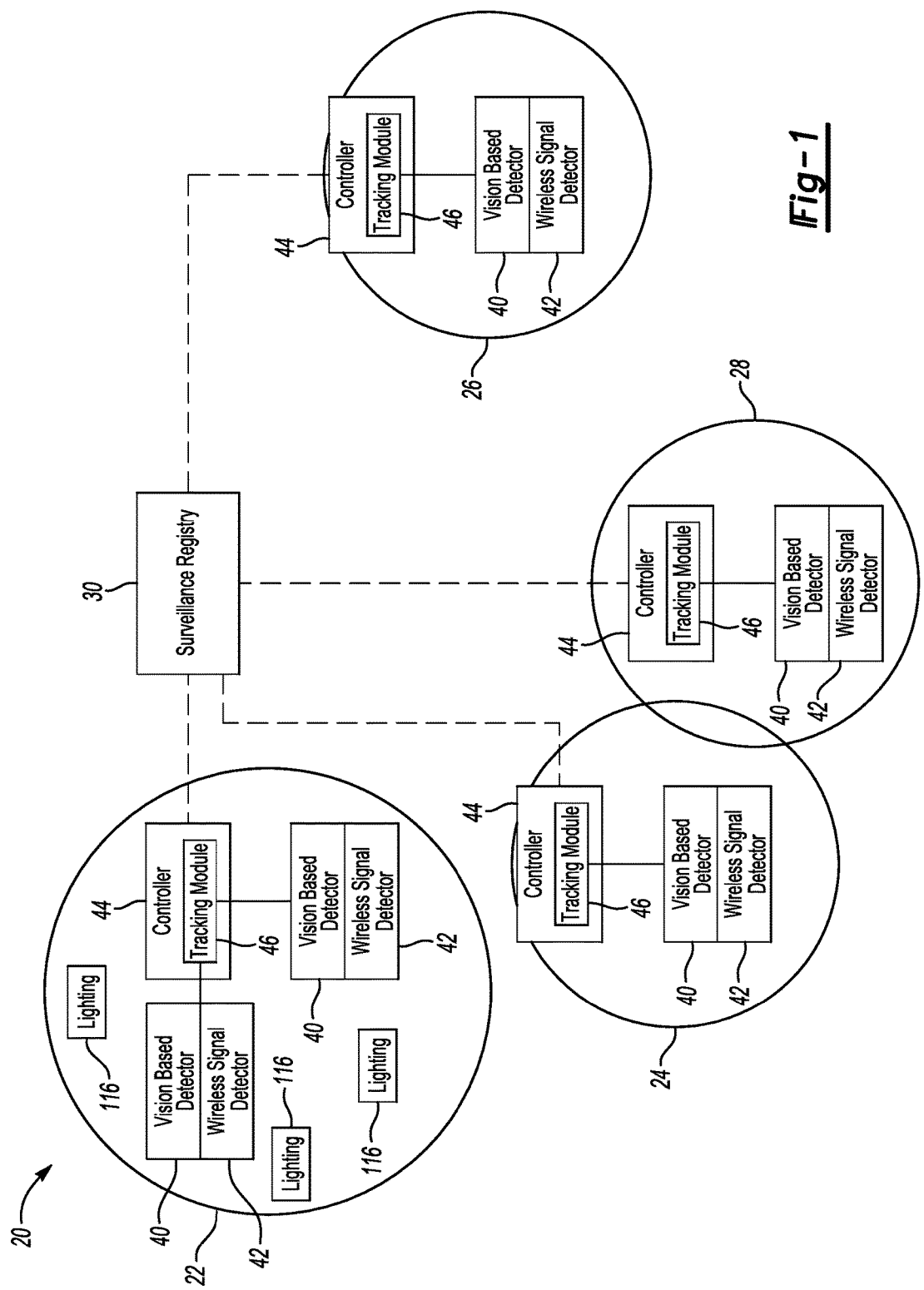
FIG. 1 schematically illustrates an example embodiment of a surveillance system.

FIG. 1 schematically illustrates selected features of an example surveillance system 20. A plurality of cells 22, 24, 26 and 28 have detection areas approximately corresponding to the boundaries of the cells. A surveillance registry 30 is accessible to each of the cells as schematically shown by the broken lines 32 in FIG. 1. Communication between the surveillance registry controller 30 and the cells may occur over a wireless communication link, an Internet connection, or a dedicated line connection. The surveillance registry 30 includes information regarding each of the cells including the type of detection available within the cell and the location of the detection area of the cell. The information in the surveillance registry 30 facilitates coordinating tracking of a subject among the cells 22-28.

In the example of FIG. 1, each of the cells includes a surveillance network having at least one first type of detector 40 that is configured to detect a first characteristic of a subject (e.g., a person or object of interest). For discussion purposes, a vision based detector is used as an example first type of detector 40. A camera is one example type of detector 40. The cell 22 includes a plurality of first type of detectors 40 that may be situated in appropriate locations within the detection area corresponding to the boundary of the cell 22. The range of the first type of detectors 40 may determine the range of the detection area.

Each of the cells 22-28 includes at least one second type of detector 42 that operates differently than the first type of detector 40. In this example, the cell 22 includes a plurality of wireless signal detectors 42 that are configured to detect at least one feature of a wireless signal associated with a subject of interest. One example implementation includes using a wireless signal detector that is capable of detecting one or more signals from a mobile station, such as cellular phone. For example, the detectors 42 may be Wi-Fi access points that detect Wi-Fi signals from cellular phones within an appropriate proximity of the access points. A detector 42 in some examples may be a femto base station or a pico base station that is capable of detecting cellular communication signals from a mobile station or cellular phone in a manner that allows for or facilitates locating the mobile station within the pico or femto cell. Other types of wireless signal detectors may be used in some example embodiments.

Some embodiments include other types of detectors as the first and second type of detector and embodiments of this invention are not necessarily limited to any particular type of sensor or detector.

The surveillance network of each cell includes a controller 44 that communicates with the detectors 40, 42 within that cell. The controller has various capabilities associated with surveillance networks. A tracking module 46 uses known techniques for tracking a subject of interest within the cell based on indications from the detectors 40, 42. The tracking module 46 in this example is configured at least to determine when surveillance should be handed off from the cell to another one of the cells, depending on movement of a tracked subject. The controller 44 is capable of making determinations regarding a tracked subject for purposes of handing off surveillance to another one of the cells, depending on the circumstances.

The controllers 44 in this example are respectively configured to obtain information from one or more of the detectors within its cell for tracking a subject. The detector information provides an indication of a location, characteristic, or activity of a subject detected by that detector. In some embodiments, the controller 44 uses information from at least one of the first type of detectors 40 and at least one of the second type of detectors 42 for purposes of tracking a subject of interest. Given this description, those skilled in the art will realize how to program one or more processors or computing devices to obtain a controller 44 that is capable of tracking a subject based on information from detectors of the type described above.

Figure 2:
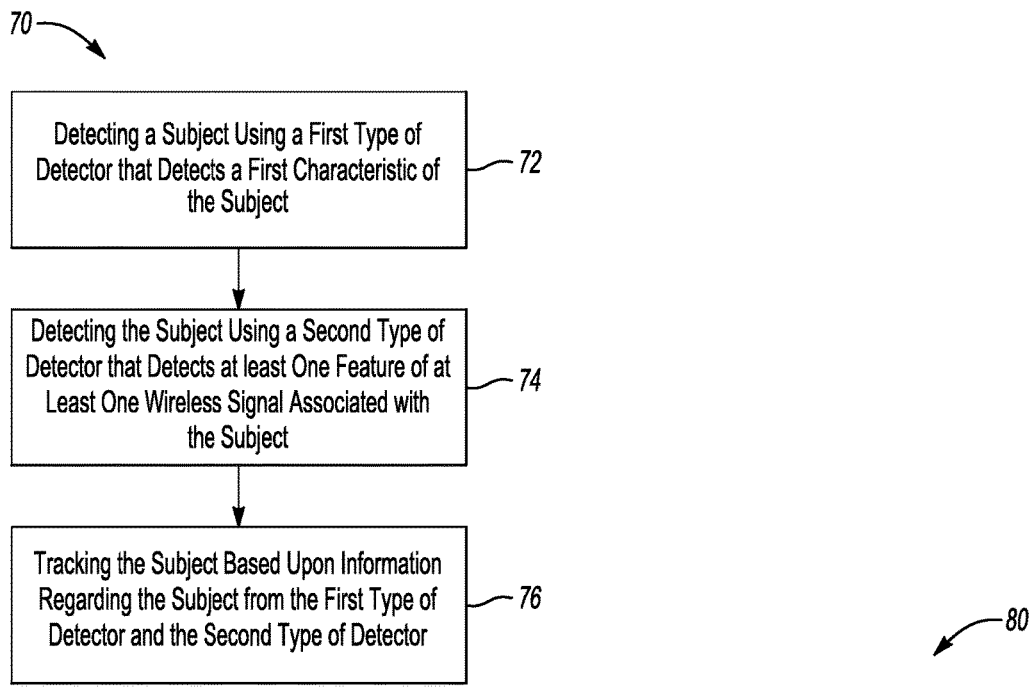
FIG. 2 is a flowchart diagram summarizing an approach for tracking a subject using two different types of detectors.

FIG. 2 is a flowchart diagram 70 that summarizes an example approach of using the two different types of detectors within one of the cells for purposes of tracking a subject. At 72 a subject is detected using the first type of detector 40 within the cell 26. The first type of detector detects a first characteristic of the subject using, for example, vision-based technology. At 74, the subject is detected using a second type of detector 42, which in this example detects at least one feature of at least one wireless signal associated with the subject. In this example, the subject is assumed to be carrying a mobile station that is configured for communicating using one or more types of wireless signals. The detector 42 detects at least one feature of such a wireless signal. The wireless signal detection provides information regarding a location of the subject of interest and the detection provided by the detector 40 provides information regarding at least the location of the subject of interest.

At 76, the subject is tracked based upon information regarding that subject from the detectors. The tracking determinations, such as location and direction of movement, occur within the tracking module 46.

One feature of the illustrated example is that it provides an ability to track a subject that moves among the detection areas of the different cells 22-28. Assume, for example, that each of the cells represents a surveillance network within a store area within a shopping mall or shopping district. Each of the stores may have its own surveillance network, which would have only worked independently of each other without including features of this embodiment of the invention. With the features of this embodiment, the separate surveillance networks or cells work together as a federated surveillance system or a cellular surveillance network.

A subject within one of the stores or cells may eventually leave that store and enter another. The surveillance registry 30 provides the controller of the currently tracking cell with information that gives that controller 44 the ability to hand off tracking that subject to another one of the cells for purpose of continuing to monitor that subject even though the subject has left the detection area of a first one of the cells.

Figure 3:
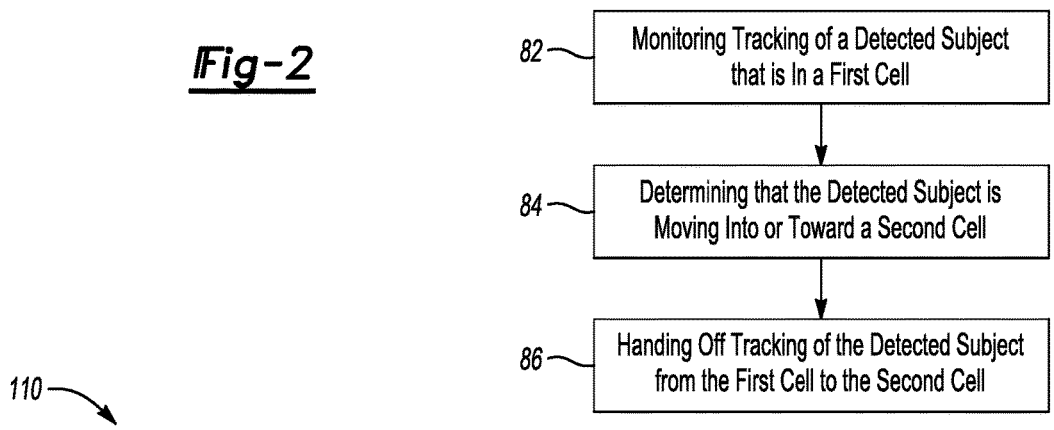
FIG. 3 is a flowchart diagram summarizing an approach for handing off tracking of a subject among different cells.

FIG. 3 includes a flowchart diagram 80 that summarizes an example approach. At 82, a detected subject in a first cell is tracked. For example, assume a subject is present within the cell 28 and being tracked using the tracking module 68. At 84, a determination is made that the subject is moving into or toward a different one of the cells. In FIG. 1, if the subject is moving into the cell 24, it may be possible to detect the subject within that cell in the overlapping portions of the detection area of the cells 24 and 28. If, on the other hand, the subject is moving toward the cell 22 or the cell 26, information regarding a trajectory of movement of the subject may be used by the tracking module 46, for example, to determine which of the cells should receive the handoff of the tracking of that subject. In some instances, the tracking module 44 of the cell 28 will make determinations regarding the trajectory of movement of the subject as the subject approaches the edge of the detection area of the cell 28 or exits that cell.

Information within the surveillance registry 30 provides an indication of which cell or cells is a good candidate for a handoff of the tracking of the subject of interest. Depending on the information that is available, the currently tracking cell (e.g., 28) alerts one or more of the cells that it is a target cell that should begin tracking a particular subject. Information, such as location coordinates, motion trajectory, and other subject characteristics, may be provided to one or more of the cells regarding the subject to allow that cell to make an appropriate identification and begin tracking that subject. A data storage layer of the controller 44, for example, maintains information regarding characteristics of a tracked subject while an analytics layer of the controller 30 determines which of the cells may be able to continue tracking based, at least in part, on information from the surveillance registry 30 regarding the types of detectors within the different cells and the detection areas of the cells. For example, an individual being tracked in a cell that has a camera-based sensor and a Wi-Fi sensor may need to be tracked in a second cell that has the same type of sensors. If continued tracking of that subject is desired and there is not a nearby cell with the same type of sensors, some embodiments include handing off tracking to a cell with different detector types provided that some correlation of tracked subject information is possible among the cells involved in the handoff.

In some examples, the cells communicate among each other regarding subjects that are moving toward another one of the cells for making possible handoffs of the tracking of that subject from one cell to another. In FIG. 3, the tracking of the detected subject is handed off at 86 from a first one of the cells, such as the cell 28, to another one of the cells, such as the cell 26.

One feature of the example system 20 is that it utilizes an object handoff protocol whenever a tracked subject approaches the edge of a detection area of roams outside the area of coverage of a particular cell. The surveillance registry 30 provides information regarding the capabilities and geographical spread of each potential target cell, which the currently tracking cell uses to identify and contact one or more target cells to attempt a handoff. In situations when there is no overlap in the detection area of adjacent cells, multiple cells may be used as targets to increase the chances of continuing to track a particular subject of interest. Utilizing multiple target cells facilities determining the exact position of a subject that needs to be located. For example, a stolen car may be identified using an automatic license plate reader. Information regarding that license plate may be provided to a plurality of target cells that have such tracking capability.

The object handoff protocol communications may include details regarding the nature or type of the subject being tracked, such as information regarding a person or object, coordinate information regarding a last known location, and motion vector information indicating a trajectory of movement. In some instances, the controller instigating the handoff provides information to the target cells, such as a set of images for video tracking, international mobile subscriber identification (IMSI) information for cellular signal tracking, or MAC address information for Wi-Fi tracking. Handoff protocol requests from one of the cells to another one of the cells may be signed using a digital certificate provided by the surveillance network controller of the currently tracking (or most recently tracking) cell. Target networks that do not have the capability of performing the type of tracking desired for a particular subject may be omitted from object handoff protocol communications to save communication and processing bandwidth and resources.

If a target cell is able to accept the request, it indicates detection of the subject to the surveillance registry controller 30 when the subject has been located. It is possible for a cell to indicate that it is unable to locate a target subject or that it is too busy to accept a request. If a cell refuses a handoff request, an appropriate indication of a reason for that is returned to the requesting controller 44 and that information may be included in the data storage of that controller for future consideration when that same potential target is considered for another handoff.

Once the target cell begins tracking a subject after a handoff, it will continue to do so until receiving a cancelled request or the subject exits the detection area of that cell. When continued tracking is desired, the current tracking cell sends information to the originating cell that instigated the first handoff and that originating cell takes appropriate action to instigate a handoff to another one of the cells.

Figure 4:
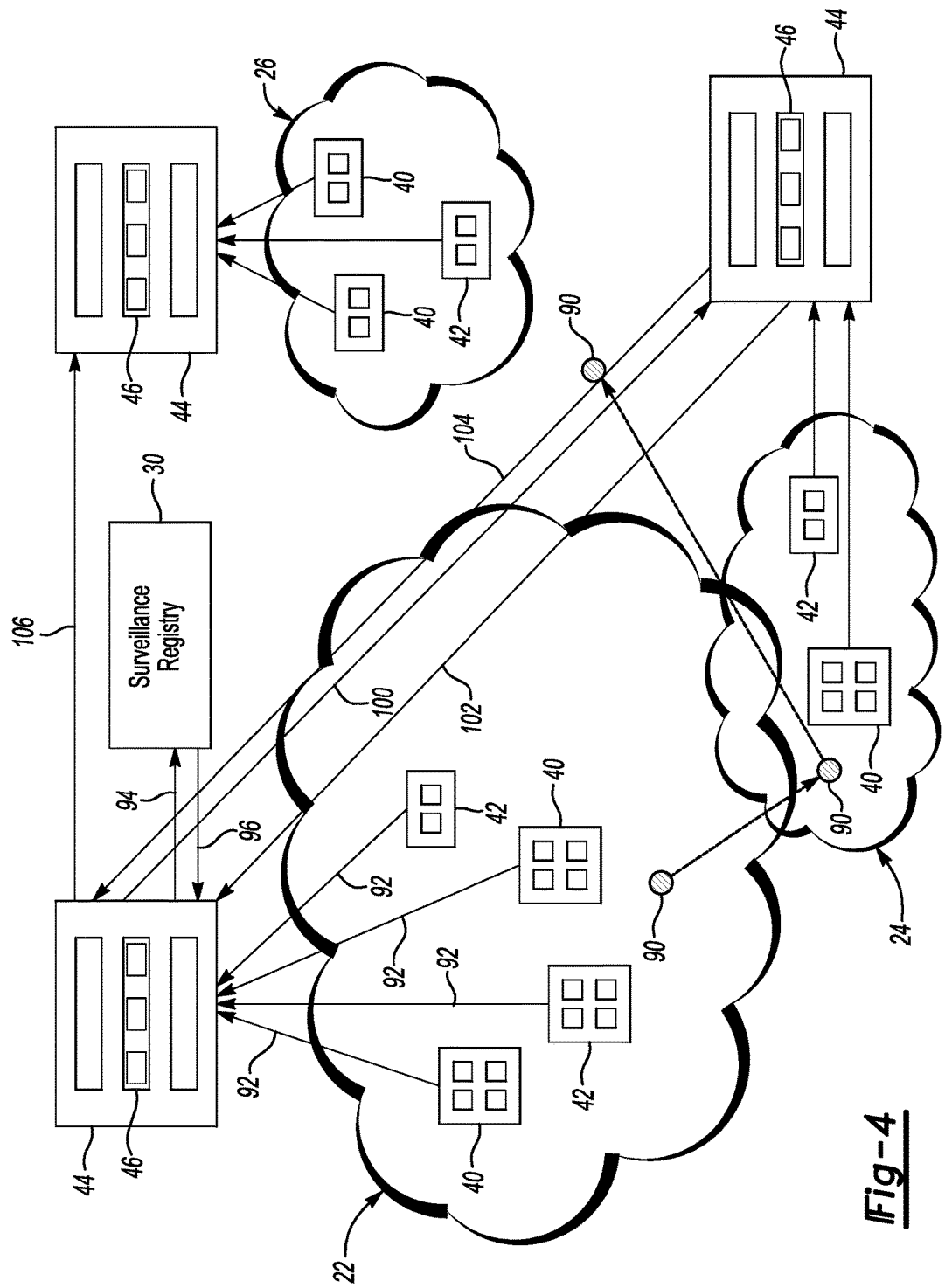
FIG. 4 schematically illustrates a handoff procedure according to an example embodiment.

FIG. 4 schematically represents an example use of a handoff protocol designed according to an embodiment of this invention. In this example, the cells 22, 24 and 26 are involved in a federated surveillance of a subject of interest 90 (e.g., an object or person). The cell 22 is considered the originating cell in this example because the subject 90 is first detected in the detection area of the cell 22. The controller 44 of the cell 22 tracks the subject 90 until it appears that the subject 90 is about to leave the detection area of the cell 22 based on information from one or more of the detectors 40, 42 as schematically shown at 92.

At 94, the controller 44 of the originating cell 22 requests information from the surveillance registry 30 regarding possible target networks. At 96, the surveillance registry provides information regarding nearby cells including the type of detectors and the detection areas of the cells, respectively. The controller 44 uses that information and the information regarding movement of the subject 90 to identify the cell 24 as a good candidate for the handoff. The cell 22 invokes the subject handoff protocol with the cell 24 by sending a request at 100 with information regarding the subject 90, such as position and motion vector information.

At 102 the cell 24 responds to the cell 22 by sending captured tracking data regarding the subject 90 while the subject 90 is being tracked in the cell 24. The captured tracking data may be, for example, a stream of coordinates or a video feed including the subject 90.

At some point in time the subject 90 moves out of the detection area of the cell 24 and at 104, the cell 24 notifies the originating cell 22 of such movement. The cell 24 provides the last known location and direction of motion information to the cell 22. The controller 44 of the cell 22 uses information from the surveillance registry 30 (either based on the most recent request or a new request for adjacent cell information) to identify a new candidate cell to continue the tracking. In this example, the subject is moving toward the cell 26. At 106, the cell 22 initiates the subject handoff protocol with the cell 26 so that tracking may continue. FIG. 4 demonstrates how the subject handoff protocol according to an embodiment allows the individual surveillance networks or cells to operate together as a federated surveillance system according to an embodiment of this invention.

Figure 5:
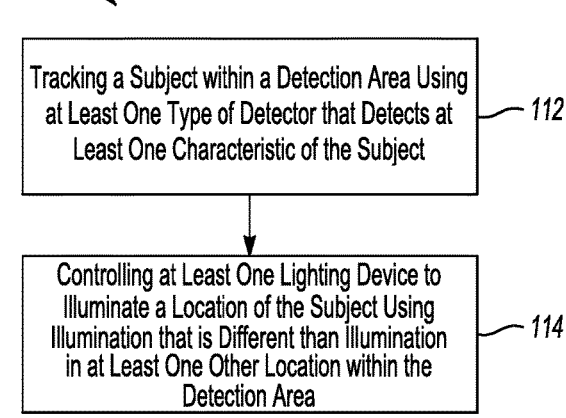
FIG. 5 is a flowchart diagram summarizing an example approach to controlling illumination based upon the location of a tracked subject.

FIG. 5 is a flowchart diagram 110 summarizing another feature of the example system 20. At 112, a subject is tracked within a detection area using at least one type of detector that detects at least one characteristic of that subject within one of the cells. At 114, at least one lighting device is controlled to illuminate a location of the subject using illumination that is different than illumination in at least one other location within the detection area. Considering the cell 22 of FIG. 1, a lighting device 116 includes the capability of providing different illumination at different locations within the cell 22. Utilizing information regarding the subject's location allows for providing different types of illumination for the subject, such as a spotlight that will assist the surveillance of that subject or assist the subject in one or more ways.

Controlling a lighting device based on location information regarding a detected subject allows for the operator of the system to notify an individual subject that they are being tracked. This feature may discourage theft if an individual is aware that their activity is being monitored. Alternatively, an individual may voluntarily request special lighting to assist that individual while shopping, for example. Further, voluntarily requesting surveillance (with or without lighting control) may provide security to an individual knowing that their whereabouts and activities are being tracked and that information regarding their location can be made available to another individual, depending on the circumstances.

The manner in which illumination may be controlled within a detection area of a cell may be based upon information from one type of detector or a combination of information from more than one type of detector as described above. Using more than one type of detector information provides a more robust tracking capability as any limitations on one of the types of detector typically will not be a hindrance of the other type of detector. For example, the orientation of an individual relative to a camera may not allow for a video-based detector to observe the individual's face and that may limit the ability to determine that the same individual is being tracked. A Wi-Fi or 4G signal, on the other hand, may reliability be continuously detected from a mobile station being carried by the subject of interest. By coordinating information from one type of detector with information from another type of detector and using that combined information for tracking an individual or other subject of interest, provides more reliable and enhanced surveillance capability.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A surveillance system, comprising:
   a plurality of cells, the cells respectively including a surveillance network including at least one detector that is configured to detect at least one type of subject, the cells having respective detection areas within which a subject may be detected by the at least one detector of the respective cell; and
   a surveillance registry accessible by the respective cells, the surveillance registry providing information to the cells regarding adjacent cells, the information in the surveillance registry including types of detectors and detection areas of the adjacent cells,
   wherein a first one of the cells uses information from the surveillance registry to hand off tracking of the subject from the first one of the cells to a second one of the cells based upon an indication from the at least one detector of the first one of the cells that the tracked subject is moving toward the detection area of the second one of the cells and based upon a determination that the information in the surveillance registry regarding the second one of the cells indicates that the second one of the cells has at least one detector that provides correlation of tracked subject information among the first and second ones of the cells.

2. The system of claim 1, wherein the detection area of the first one of the cells at least partially overlaps with the detection area of the second one of the cells.

3. The system of claim 1, wherein the first one of the cells includes a controller that
   receives information regarding the tracked subject, the information being based upon detection by the at least one detector of the first one of the cells;
   determines at least a location of the tracked subject in the detection area of the first one of the cells;
   determines an approximate direction of movement of the tracked subject that indicates the tracked subject is moving toward or into the detection area of the second one of the cells;
   provides a request to the second one of the cells for the at least one detector of the second one of the cells to detect the tracked subject; and
   determines whether the tracked subject is being tracked in the second one of the cells.

4. The system of claim 3, wherein the instructions provided by the controller of the first one of the cells comprise information regarding a signal of the detector of the first one of the cells corresponding to detecting the tracked subject; and
   information regarding an approximate location or direction of movement of the tracked subject as the tracked subject approaches the second one of the cells.

5. The system of claim 1, wherein
   the at least one detector comprises a first type of detector that detects a first characteristic of the subject and a second type of detector that detects at least one feature of at least one wireless signal associated with the subject; and
   the respective cells include a tracking module that tracks the subject based upon information from the first type of detector and the second type of detector.

6. The system of claim 5, wherein the second type of detector provides information regarding a location of the subject based on a cell phone signal.

7. The system of claim 1, wherein
   at least one of the cells includes a lighting device that provides light within the detection area of the at least one cell;
   a controller of at least one cell determines a location of the tracked subject within the detection area of the at least one cell; and
   the controller controls the lighting device to illuminate the determined location of the tracked subject with an amount of illumination that differs from an amount of illumination in other locations within the detection area of the at least one cell.

8. A surveillance method using a plurality of cells, the cells respectively comprising a surveillance network including at least one detector that is configured to detect at least one type of subject, the cells having respective detection areas within which a subject may be detected by the at least one detector of the respective cell, the surveillance network including a surveillance registry including types of detectors and detection areas of the cells, the method comprising the steps of:
   obtaining information regarding tracking of a detected subject that is in a first one of the cells;
   determining from the information in the surveillance registry regarding a second one of the cells that the second one of the cells has at least one detector that provides correlation of tracked subject information among the first and second ones of the cells; and
   handing off tracking of the detected subject from the first one of the cells to the second one of the cells based upon the determining and based upon an indication that the tracked subject is moving toward the detection area of the second one of the cells.

9. The method of claim 8, comprising
   determining at least a location of the tracked subject in the detection area of the first one of the cells;
   determining an approximate direction of movement of the tracked subject that indicates the tracked subject is moving toward or into the detection area of the second one of the cells; and
   providing instructions for the at least one detector of the second one of the cells to detect the tracked subject.

10. The method of claim 9, wherein providing the instructions comprises
    providing information regarding a signal of the detector of the first one of the cells corresponding to detecting the tracked subject; and providing information regarding an approximate location or direction of movement of the tracked subject as the tracked subject enters the second one of the cells.

11. The method of claim 8, wherein the at least one detector comprises
a first type of detector that detects a first characteristic of the subject; and
a second type of detector that detects at least one feature of at least one wireless signal associated with the subject.

12. The method of claim 11, wherein the second type of detector provides information regarding a location of the subject based on a cell phone signal.

13. The method of claim 8, comprising
determining a location of the tracked subject within the detection area of at least one cell; and
controlling a lighting device that provides light in the detection area of the at least one cell to illuminate the determined location of the tracked subject with an amount of illumination that differs from an amount of illumination in other locations within the detection area of the at least one cell.

14. A surveillance system, comprising:
at least one detector configured to detect a subject within a detection area;
at least one lighting device that provides light within the detection area;
a controller that determines a location of the tracked subject within the detection area, the controller controls the at least one lighting device to illuminate the determined location of the tracked subject with illumination that differs from illumination in at least one other location within the detection area; and
a surveillance registry that is accessible by the respective controllers of the detection areas, the surveillance registry providing information to the controllers regarding adjacent cells, the information in the surveillance registry including types of detectors and detection areas of the adjacent cells and wherein the controller of the first one of the detection areas determines to hand off tracking of the tracked subject to the second one of the detection areas based upon a determination that the information in the surveillance registry regarding the second one of the detection areas indicates that the second one of the detection areas has at least one detector that provides correlation of tracked subject information among the first and second ones of the detection areas.

15. The system of claim 14, wherein
the at least one detector comprises a first type of detector that detects a first characteristic of the subject and a second type of detector that detects at least one feature of at least one wireless signal associated with the subject; and
the controller determines the location of the tracked subject based on information from the first type of detector and the second type of detector.

16. The system of claim 14, wherein
there are a plurality of detection areas including respective detectors and respective lighting devices;
a controller of a first one of the detection areas determines when the tracked subject is moving from the first one of the detection areas to a second one of the detection areas; and
a controller of the second one of the detection areas controls the illumination of the determined location in a manner that the lighting device of the second one of the detection areas illuminates the determined location when the tracked subject moves into the second one of the detection areas.

* * * * *